April 2, 1968     D. L. CORL     3,376,059
CONVERTIBLE TRAILER AND SUPPORTING POST THEREFOR
Filed April 7, 1966     2 Sheets-Sheet 1
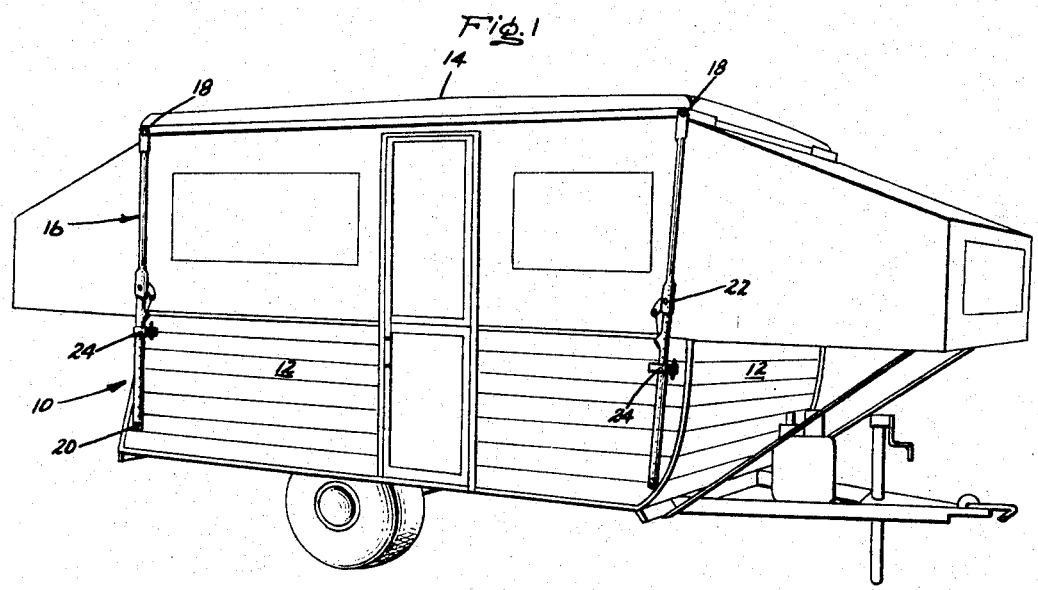
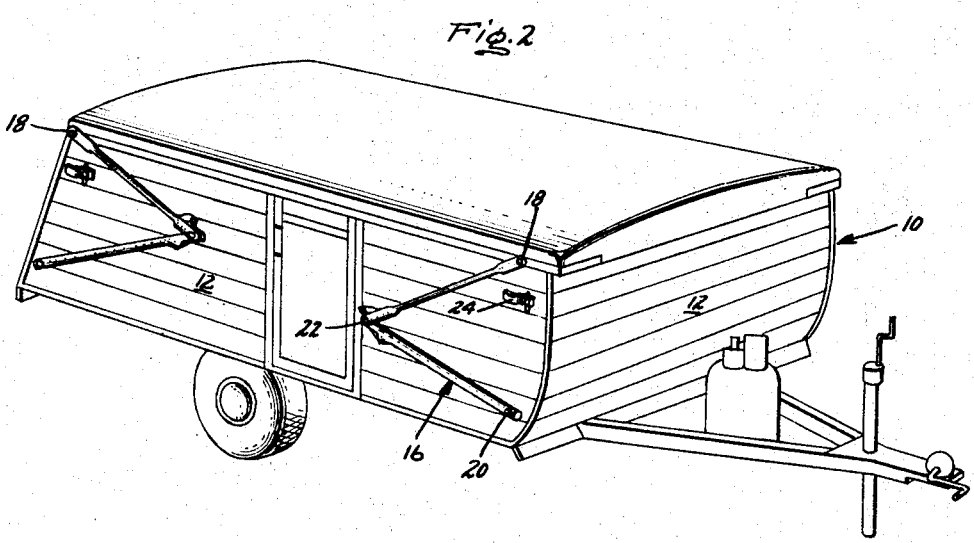
Inventor:
Donald L. Corl,
by Wood, Gutruloh
Attorneys.

April 2, 1968     D. L. CORL     3,376,059
CONVERTIBLE TRAILER AND SUPPORTING POST THEREFOR
Filed April 7, 1966     2 Sheets-Sheet 2
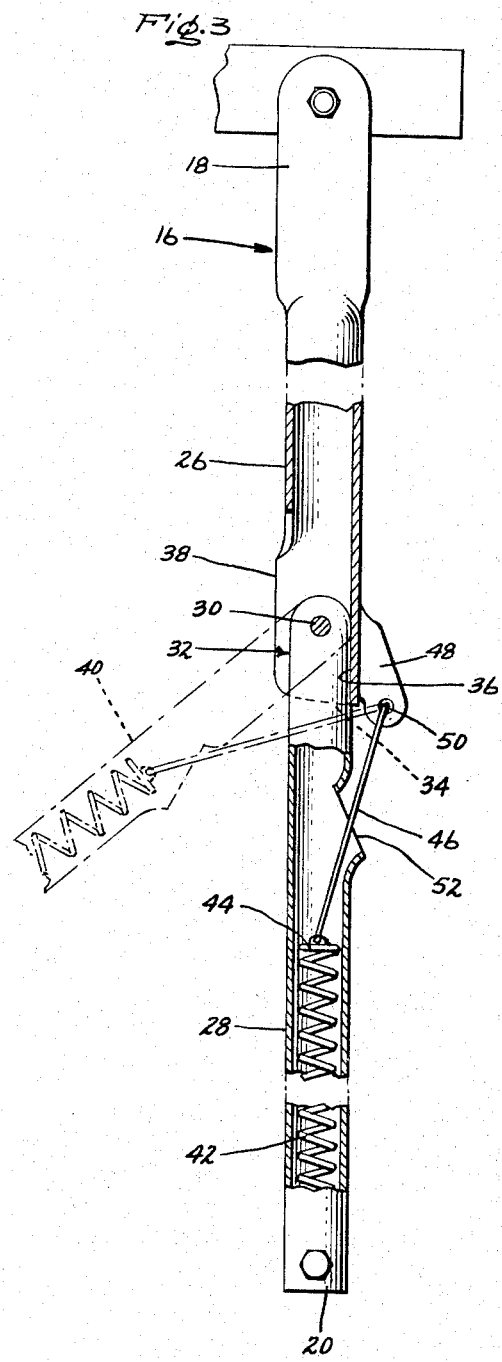
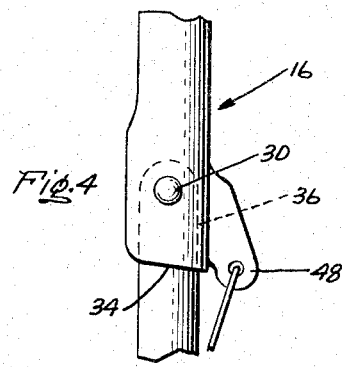
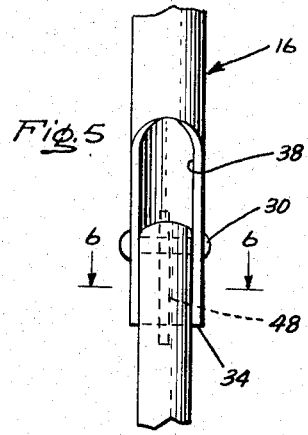
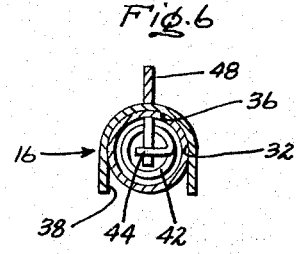
INVENTOR.
Donald L. Corl,
BY Hood, Gust & Irish
Attorneys.

United States Patent Office 3,376,059
Patented Apr. 2, 1968

3,376,059
CONVERTIBLE TRAILER AND SUPPORTING POST THEREFOR
Donald L. Corl, Nappanee, Ind., assignor to Exterior Products, Inc., Nappanee, Ind., a corporation of Indiana
Filed Apr. 7, 1966, Ser. No. 541,007
4 Claims. (Cl. 287—99)

ABSTRACT OF THE DISCLOSURE

A convertible trailer and supporting post apparatus therefor including two elongated members pivotally connected at the ends thereof. The upper end of one member projects or telescopes slightly into the lower end of the other member. This lower member end may be regarded as a socket. The backside of the socket is adapted to be engaged by a portion of the upper member end for positioning the members in straight-line alignment. The front side of the socket is provided with an elongated opening which is sufficiently enlarged to allow the upper member end to be positioned therein. The members thus are movable with respect to each other about the pivotal connection. A helical spring is mounted within the member not having the socket above-mentioned and is secured at its lower end to this member. The upper end of the spring is secured to a rod or wire which extends through an opening in this member and connects to the lower end of a rigid bracket secured to the exterior of the socket portion of the lower member end. The point to which the rod is connected to this bracket is positioned beneath the pivotal connection of the members and rearwardly of the members. Thus a moment arm is established between the connection of the rod to the bracket and the pivotal connection of the members. The rod is chosen with a length which will tension the spring when the members are in straight-line alignment whereby the spring acts to maintain this straight-line alignment.

---

The present invention relates to a convertible trailer and a supporting post therefor, and more particularly to a convertible trailer having an elevatable top which is supported with respect to the chassis by means of articulated posts.

Convertible mobile homes or house trailers known as campers include a base portion having relatively short, upstanding walls into which may be packed the flexible, tent-like fabrics of the trailer when the same is erected for occupancy. A cap or cover fits over the base portion and is operatively secured thereto by means of post members which can be selectively collapsed and erected.

The trailer cover is normally quite heavy and difficult for a person to lift when the same is being erected. It usually is more convenient for two and perhaps more people to perform the lifting and erecting operations.

It is an object of this invention to provide a convertible trailer construction wherein mechanism is incorporated for assisting the manual erection of the cover.

It is another object of this invention to provide a unique supporting post capable of exerting an erecting force independently of any manual operation.

It is yet another object of this invention to provide an articulated supporting post so constructed and arranged as to exert a constant force which tends to hold the post in straightened condition.

Other objects will become apparent as the description proceeds.

In the broader aspects of this invention there is provided a supporting post for a convertible trailer having two elongated members pivotally connected together at one end thereof. The members include portions which abut each other when the members are placed in straight-line alignment. The members are swingable with respect to each other about the pivotal connection therebetween, and means is provided interconnecting the members for yieldably urging the members into straight-line alignment.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a perspective view of a convertible trailer which incorporates the principles of this invention;

FIG. 2 is a perspective view of the same trailer but in collapsed condition;

FIG. 3 is a fragmentary, partially sectioned view of one of the supporting posts of the trailer of FIGS. 1 and 2;

FIG. 4 is a fragmentary side view of the supporting post of FIG. 3;

FIG. 5 is a fragmentary rear view thereof; and

FIG. 6 is a cross-section taken substantially along section line 6—6 of FIG. 5.

Referring to the drawings, and more particularly to FIGS. 1 and 2, a conventional, convertible trailer, commonly referred to in the trade as a "camper," comprises a base portion 10 having four, relatively short upstanding sides 12. A cover or cap 14 disposed above the sides 12 is movable between collapsed and erected positions, the former being shown in FIG. 2 and the latter in FIG. 1. When the cover 14 is collapsed to the position shown in FIG. 2, it completely covers the base portion of the camper and places the latter in condition for traveling.

Securing the cover 14 to the base 12 are four articulated supporting posts 16 located at the corners thereof, respectively. At the upper ends 18, these posts are pivotally connected to the corners, respectively, of cover 14. At the lower ends 20, the posts are pivotally connected to the respective corner portions of the base 12. Each post 16 is composed of two separate, elongated members pivotally connected in the general vicinity of the reference numeral 22. By this means, each post 16 may be pivotally collapsed to the positions shown in FIG. 2 so as to lower the cover 14 from the position shown in FIG. 1 to the collapsed position shown in FIG. 2. The precise construction of the supporting posts 16 will be explained later.

Once the posts 16 are erected to the positions shown in FIG. 1, each is abutted against a stop or clamp 24 which holds the post in stable, erect position.

Referring to FIGS. 3 through 6, the construction of the individual posts will be described. Each post 16 includes an upper elongated member 26 of metal tubing and a second lower member 28 of similar tubing. These two members 26 and 28 are pivotally connected at the ends thereof by means of a pivot pin 30. As shown more clearly in FIGS. 3 and 4, the upper end of the member 28 projects or telescopes slightly into the lower end of the member 26. This lower end of the member 26 may be regarded as a socket denoted by the reference numeral 32. The lower extremity 34 of this socket is shown as being spaced below the pivot pin 30. The reason for this will become apparent from the description that later follows.

The back side 36 of the socket 32 is engaged by a portion of the upper end of the member 28 as shown more clearly in FIGS. 3 and 6. All of the parts are so arranged that when this engagement occurs, the two members 26 and 28 will be in straight alignment, thereby providing the straight shape shown for the posts 16.

The front side of the socket 32 is provided with an elongated opening as indicated by the numeral 38. As shown more clearly in FIGS. 5 and 6, this opening 38 is made wide enough so as to receive therethrough the upper end of the member 28 when the latter is swung to the dashed line position 40 of FIG. 3. As shown in FIG. 5, the pivot pin 30 is situated transversely of the opening 38.

A relatively strong, helical tension spring 42 is fitted into the lower member 28 and is secured at its lower end to the end 20. The upper end 44 of the spring is secured to a rod or wire 46 which also connects to the lower end of a rigid bracket 48 secured to the rear side of the member 26. This bracket 48 is preferably a rigid metal piece secured to the lower extremity of the member 26 opposite the socket portion 32. Further than this, the point 50 to which the rod 46 is connected is situated beneath the pivot pin 30 as shown and rearwardly of the member 26 in the direction opposite or away from the opening 38.

The rod 46 extends through an opening 52 in the lower member 28 as shown, and the length of this rod 46 is made such that the spring 42 is tensioned with the members 26 and 28 in the straight alignment shown in FIG. 3. The particular point of connection 50 between the rod 46 and the bracket 48 is to the right of the pivot pin 30 as shown in FIG. 3 and also below. Thus, a moment arm extending between the point 50 and the pivot pin 30 is provided whereby tension exerted by the spring 42 will tend to align the members 26 and 28 into the straightened condition shown. The tension spring 42 does, in this straightened condition, cause abutting engagement of the adjacent pivot-pin end portions of the two members 26 and 28 as shown.

The opening 38 in the socket 32 is provided for receiving the upper end of the member 28 therethrough when the two members 26 and 28 are pivoted to the dashed line position 40 of FIG. 3. The extent to which the parts 26 and 28 may be swung relative to each other will depend upon the location of the pivot 30, the length of the spring 42, the location of the aperture 52, as well as the location of the connecting point 50. In any event, when the members 26 and 28 are swung to the dashed line position 40 of FIG. 3, the spring 42 is further tensioned so as to exert a greater force, tending to swing the member 28 around into straight-line alignment with the member 26.

Now referring to FIGS. 1 and 2, it will be noted that when the posts 16 are pivoted as shown in FIG. 2, the cover 14 is closed on the base 10. An individual desiring to erect the cover 14 needs only to exert a slight lifting force thereon, just enough to start the cover 14 in upward motion. The springs 42 in all of the posts exert forces, tending to straighten the posts 16, thereby assisting this manual lifting force. By selecting springs of proper tension and strength, only a minimum amount of manual lifting force is required for erecting the cover 14 to the position shown in FIG. 1. The use of the springs 42 in the particular post construction thereby minimizes the manual strength required in order to erect properly the cover.

While there have been described above the principles of this invention in connection with specific apparatus, it is to be clearly understood that this description is made only by way of example and not as a limitation to the scope of the invention.

What is claimed is:

1. A supporting post for a convertible trailer comprising first and sceond elongated members pivotally connected together at one end thereof, means including portions of said members in abutting engagement for positioning said members in straight-line alignment, said members being swingable with respect to each other about the pivotal connection therebetween, a rigid element secured to one of said members adjacent to said abutting member portions of said means, the other of said members being swingable with respect to said one member about the pivotal connection from straight-line alignment in one direction, said element extending outwardly from said one member in a direction opposite to said one direction and having a portion spaced from the pivotal connection of said members, a spring secured within said other member, and means connecting said spring to said element portion.

2. A supporting post for a convertible trailer comprising first and second elongated members pivotally connected together at one end thereof, means including portions of said members in abutting engagement for positioning said members in straight-line alignment, said members being swingable with respect to each other about the pivotal connection therebetween, and means interconnecting said members for yieldably urging said portions into abutting engagement and also for yieldably opposing swinging movement thereof in a direction away from said abutting engagement, the pivot end of one member being hollow and providing a socket which receives in telescoped relation a portion of the pivot end of the other member, the side of said one member which is juxtaposed with respect to the telescoped portion of said other other member having an opening which receives the latter portion therethrough, said pivot pin being spaced from the end of said socket and positioned such that said telescoped portion can be swung through said opening, said other member being hollow and having disposed therewithin a helical tension spring, one end of said spring being attached to the end of said other member opposite said pivot end, lever means on said one member extending in a direction away from said opening, and means connecting the other end of said spring to said lever means for tensioning said spring and urging said members into abutting engagement.

3. The post of claim 2 wherein said lever means includes a rigid element secured to said one member on the side thereof opposite said opening, said element extending outwardly from said one member in a direction away from said opening and having a portion spaced from said pivot pin in a direction toward said one member end, said spring being attached to said element portion thereby providing a moment arm which in cooperation with the force exerted by said spring urges said member into straightened alignment.

4. The post of claim 3 wherein said other member is provided with an aperture adjacent to the other end of said spring, said aperture being in the same side of said other member as said rigid element, and a rod-like element received by said aperture connected between said rigid element and said other end of said spring, said spring being tensioned with said members being in straightened alignment and being tensioned further upon pivotal movement of said members with respect to each other whereby a constant force is exerted tending to align said members.

References Cited
UNITED STATES PATENTS

| | | | |
|---|---|---|---|
| 2,459,280 | 1/1949 | Lange | 248—159 |
| 2,601,999 | 7/1952 | Sly | 287—99 |
| 2,610,076 | 9/1952 | Walsh | 287—96 |
| 2,711,875 | 6/1955 | Boltuch | 248—292 |
| 3,184,261 | 5/1965 | Youne | 287—99 X |

ROY D. FRAZIER, *Primary Examiner.*

ROBERT P. SEITTER, *Assistant Examiner.*